United States Patent [19]

Mazzucco

[11] 4,237,235
[45] Dec. 2, 1980

[54] URETHANIC POLYMERIZATION BY CHELATING AGENTS ACTING AS CATALYSTS OR COCATALYSTS

[76] Inventor: Rosalba Mazzucco, Corso Vinzaglio, 3, Torino, Italy

[21] Appl. No.: 935,379

[22] Filed: Aug. 21, 1978

[51] Int. Cl.³ .................. C08G 18/18; C08G 18/22; C08G 18/14; C08G 18/48
[52] U.S. Cl. .................. 521/118; 521/107; 521/124; 521/125; 521/126; 521/127; 521/128; 521/130; 521/131; 521/902; 528/55; 528/56; 528/57
[58] Field of Search .............. 521/125, 124, 902; 528/57, 55, 56

[56] References Cited

U.S. PATENT DOCUMENTS

| | | | |
|---|---|---|---|
| 2,933,462 | 4/1960 | Fischer | 528/55 |
| 3,028,345 | 4/1962 | Johnson | 521/125 |
| 3,108,975 | 10/1963 | Lambert et al. | 521/125 |
| 3,422,036 | 1/1969 | Ellegast et al. | 521/125 |
| 3,634,345 | 1/1972 | Diehr et al. | 521/125 |
| 3,798,198 | 3/1974 | Hole | 521/130 |
| 3,896,052 | 7/1975 | Lockwood et al. | 521/125 |
| 4,011,180 | 3/1977 | Lockwood et al. | 521/125 |
| 4,026,836 | 5/1977 | Zimmerman et al. | 521/125 |
| 4,101,465 | 7/1978 | Lockwood et al. | 521/125 |
| 4,126,742 | 11/1978 | Carleton et al. | 528/57 |

Primary Examiner—H. S. Cockeram
Attorney, Agent, or Firm—Young & Thompson

[57] ABSTRACT

Urethane polymers are produced by reacting isocyanate with hydroxyl compounds in the presence of a catalytic amount of a chelating catalyst or cocatalyst which is a complex of a chelating agent with metallic ions and which does not react with the reagents.

9 Claims, No Drawings

URETHANIC POLYMERIZATION BY CHELATING AGENTS ACTING AS CATALYSTS OR COCATALYSTS

This invention relates to the improvement of urethanic polymerization by chelating agents acting as catalysts or cocatalysts.

Particularly, the present invention relates to the use of organic chelating agents as catalysts in the polyurethanic reactions between hydroxyl and isocyanate groups.

The object of this invention is to obtain a urethane polymerization in which an isocyanate reacts with hydroxyl compounds in the presence of catalysts, characterized in that there are used as catalysts or cocatalysts those compounds able to form complexes with metallic ions so that these last do not undergo standard reactions in the presence of reacting compounds. Chelating agents here considered are mono- and polycarboxylic amino acids, where the carboxyl or the carboxyls are preferably neutralized partially or completely with metallic cations in order to form the corresponding metallic salts.

The best known of this class of compounds is ethylenediaminetetracetic acid (EDTA $H_4$) and its sodium salts. Among these it is preferable to use the partially salified salts, for example EDTA $Na_3$ or EDTA $Na_{3.5}$.

Another member of this class, still more efficient as catalyst, is sodium nitrilotriacetate (NTA $Na_3$). The higher catalytic efficiency of this last product is due to the fact the nitrogen is less sterically blocked and thus the catalysis mechanism is enhanced. It is thought in fact that this mechanism acts by the formation of a bond between the amine derivative and isocyanate, and that this bond is easier formed if the nitrogen is sterically free. The following is what may happen during bond formation between isocyanate and sodium nitrilotriacetate.

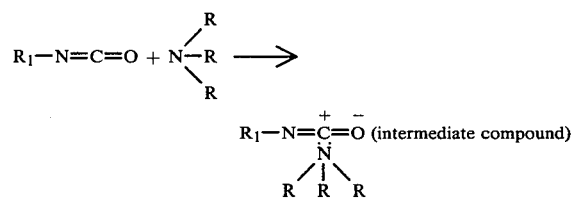

Other compounds of this class that can be used as catalysts in the polyurethane reactions include diethylenetriaminepentacetic acid (DTPA) and its salts, preferably tetrasodium. Other compounds used with good result, and particularly interesting for their solubility in a non-aqueous solvent, are hydroxyethyl ethylenediaminetriacetic acid (HEEDTA) and its salts, preferably trisodium, and 2-hydroxy-1-3-diaminepropylenetetracetic acid (HPDTA) and its salts, preferably trisodium. These last members of this class are compounds containing in their molecule 1 or 2 hydroxyls; and thus to their catalytic action is added the reaction between the function OH and the function NCO.

Also mixed salts of heavier metals and alkali metals can be advantageously used as catalysts, and they delay the starting of the reaction (giving a longer cream time) and accelerate the final polymerization, as will be seen hereinafter. Among these we mention the iron and sodium salts, and the manganese and sodium salts of hydroxyethyl ethylenediaminetriacetic acid.

The hypothesis of catalysis by complex formation can explain the catalytic action of this class of compounds, whose chelating action is due, as is well known, to complex formation. As is well known in the art of polyurethane chemistry, the metallic cations and the basic medium favor urethane polymerization.

The alkaline cations when present in these chelating salts, have a more controlled action than other alkali metal salts derived from different acids (organic or inorganic). The salts of these chelating compounds containing also heavier metals, because of their increased solubility and stability can develop a greater catalytic action when compared to other organic and inorganic forms of these metals. The catalytic action controlled by chelating metals could be explained as follows: the chelate Me acts as a metallic ion reserve; and there is a balance between the chelated metal, the chelating agent and the free metallic ion. If the free metallic ion is consumed or otherwise disabled in the reaction, other ions are released from the chelate and the low initial concentration of the metal is constant. Thus the more controlled reaction rate can be explained by the constant and well-controlled concentration of catalyst present in the chelating agent.

As already stated, this group of compounds that are here disclosed as catalysts for polyurethane reactions have a particular characteristic that makes them very interesting in polyurethane reactions, generally, and above all in PU reactions with formation of expanded or microcellular products. This characteristic consists in the slowing down of initial reaction times without modifying, and on the contrary shortening, in some cases, the rise time and the demolding time when particular molded products are produced. In this last case, where today speedier molding cycles are demanded, the use of these catalysts can allow the increase of the reactivity of the compounds without interfering with good flushing of the material in the mold. Furthermore, in some types of foam formulations, the so-called cold foams, based on activated polyols, and especially when the isocyanate used is toluenediisocyanate, the use of a catalyst of the present invention allows one to obtain easier expanded products without collapse or shrinkage due to closed cells of the foam. When, instead of these catalytic members of a chelating family, a classic catalyst such as triethylenediamine and/or tin compound is used, it is very difficult to find the right balance between collapse and shrinkage. The best results, as regards the fast attainment of final polymerization, are obtained using these chelating catalysts joined to other catalysts of the amine type, already used in polyurethane reactions, i.e. triethylamine, dimethylethanolamine, etc. Good results in terms of fast polymerization are obtained using with the chelating catalyst more than one amine catalyst, including among these also triethylenediamine, or a usual combination of catalysts. In this last case the action of the chelating agent has essentially the function of cream-time delayer and accelerator of final polymerization.

When the foaming material is normally formulated with tin octoate and amine catalysts, the chelating agent can replace in this case the amine catalyst.

The choice of the most suitable chelating compound depends from the formulation. If water is present—as in the case of flexible and semi-rigid foam—it is possible to choose a product without OH groups.

In fact these products are soluble only in water. For formulations without water it is necessary to use the products containing OH and soluble for example in dipropyleneglycol. Furthermore if it is necessary to control the pH of the formulation, the necessary quantity of a non-salified chelate would be added as the sodium salt. If the alkali metal cation—used in some formulations for producing thick blocks where the internal temperature of the block is very high—negatively influences the mechanical properties of the foam, it may be convenient to add a small quantity (1–3%) of organic halogen compound, for example a chlorinated paraffin or tridibromopropylphosphate, already generally used in foam when a greater flame protection is demanded.

The halogen compound can enable the halogen acid to decrease the alkalinity and then to avoid uncontrolled reactions; besides, it can react with free radicals, thereby decreasing compressibility of the foam.

EXAMPLES

There follow two comparative formulations of semi-rigid foam cold cured, in which in formula No. 1 a 33% solution of triethylenediamine in dipropyleneglycol (commercial name Dabco 33LV) has been used, and in formula No. 2 Dabco has been replaced by the chelating compound sodium nitrilotriacetate The latter is a formulation based on an activated polyol and methylenediphenyldiisocyanate.

| Formulations | No. 1 | No. 2 |
|---|---|---|
| Triol M.W. 48000 | 88 | 88 |
| (Daltocel 32/75) | parts by wt. | parts by wt. |
| Triethanolamine | 5 | 5 |
| Water | 3 | 3 |
| Dabco 33LV | 0.3 | 0.3 |
| Sodium nitrilotriacetate | — | 1 |
| Triethylamine | 0.5 | 0.5 |
| Methylenediphenyldiiso-cyanate (Suprasec DNR) | | |
| Index | 105 | 105 |

As is known, by index is meant the isocyanate quantity used with reference to stoichiometric. For example, index 100 means a stoichiometric quantity and index 105 a 5% excess of stoichiometric.

| Formulations | No. 1 | No. 2 |
|---|---|---|
| Cream time (seconds) | 20 | 28 |
| Rise time (seconds) | 70 | 70 |
| Demolding time (minutes) | 3 | 3 |

There follows an example of flexible foam for cushions, of the so-called "cold" type, based on activated polyol and on toluenediisocyanate. Here we have not made the comparison between the chelating compound and the triethylenediamine or other kinds of catalysts, because the chelating compound allowed a molding facility that we have not obtained without the mentioned chelating compound.

In this case we used sodium hydroxyethyl ethylenediaminetriacetate, with an amine catalyst trademarked Polycat 21.

| Formulation No. 3 | |
|---|---|
| Triol M.W. 4800 | |
| (Daltocel 32/75) | 70 |

| -continued | |
|---|---|
| Formulation No. 3 | |
| Triol copolymer M.W. 6000 | |
| (Niax 31-28)- | 30 |
| Water | 2.8 |
| Sodium hydroxyethyl ethylene-diaminetriacetate (HEEDTA Na) | 0.3 |
| Polycat 21 | 0.8 |
| Tridibromopropylphosphate | 2 |
| Silicone DC 11630 | 0.05 |
| TDI, Index | 105 |

These products in some cases can act as synergistic catalysts.

The following is an example where sodium nitriletriacetate is used in order to improve the reaction times (cream time longer and demolding time shorter), together with classic catalysts:

| Formulations | No. 4 Parts by Wt. | No. 5 Parts by Wt. |
|---|---|---|
| Polyol triol M.W. 4800 | | |
| (Daltocel 32/75) | 100 | 100 |
| Diethanolamine | 1.5 | 1.5 |
| Tetrol NOH520 | | |
| (Caradol 520) | 5 | 1.5 |
| Water | 2.8 | 2.8 |
| Dabco powder | 0.1 | 0.1 |
| Triethylamine | 0.5 | 0.5 |
| Silicone 3043 | 0.8 | 0.8 |
| Sodium nitrilotriacetate | — | 1 |
| Blended isocyanates: | | |
| 50 p. methylenediphenyl-diisocyanate | | |
| 50 p. toluenediisocyanate 80/20 | | |
| Index | 102 | 102 |
| Cream time (seconds) | 12 | 14 |
| Rise time (seconds) | 130 | 105 |

In formulation No. 5, the sodium nitriletriacetate chelating agent is used as a synergistic in order to improve the reaction time.

The following is an example of a flexible foam standard formulation for slab-stock production; in this formulation the sodium hydroxyethyl ethylenediaminetriacetate (HEEDTA Na) is used with tin octoate.

| Formulation No. 6 | |
|---|---|
| Triol M.W. 3600 | |
| (Voranol CP 3322) | 100 |
| Water | 4 |
| Silicone oil | |
| (L 540) | 0.8 |
| HEEDTA Na | 0.06 |
| Tin octoate | 0.20 |
| Tridibromopropylphosphate | 2 |
| TDI Index | 105 |

I claim:

1. In a method of producing urethane polymers by reacting isocyanate with hydroxylic polyether compound in the presence of a catalytic amount of chelating agent catalysts or cocatalysts; the improvement in which said catalysts or cocatalysts are complexes of said chelating agents with metallic ions and do not react with the reactive components, said chelating agents being mono- or polycarboxylic amino acids or metallic salts thereof.

2. A process according to claim 1, wherein the chelating agents used as catalysts or cocatalysts are complexes with metallic ions of: aminopolycarboxylic acids; alkylenediaminopolycarboxylic acids; hydroxyalkylamine-poly-carboxylic acids; hydroxyalkylalkylenediaminopolycarboxylic acids.

3. A process according to claim 2, wherein said salts are salts of alkali metals of said aminopolycarboxylic acids and hydroxyaminopolycarboxylic acids.

4. A process according to claim 1, wherein said catalysts or cocatalysts are alkali metal compounds of: nitrilotriacetic acid; ethylenediaminetetracetic acid; hydroxyethyl ethylenediaminetriacetic acid; diethylenetriaminepentacetic acid; 2-hydroxy, 1,3 diaminepropylenetetracetic acid.

5. A process according to claim 1, wherein said catalysts or cocatalysts are employed in a portion of between about 0.01 and 3% by weight of said urethane polymer.

6. A process according to claim 1, wherein the catalysts or cocatalysts are used alone or in combination with tertiary amine catalysts.

7. A process according to claim 2, wherein at least one of said aminopolycarboxylic and hydroxyaminopolycarboxylic acids are used in combination with alkaline metal complexes of said acids.

8. A process according to claim 1, wherein the chelating agent is used in combination with tin octoate.

9. A process according to claim 1, wherein the chelating agent is used with organic tin compounds.

* * * * *